Patented Mar. 12, 1946

2,396,343

UNITED STATES PATENT OFFICE 2,396,343

CHROMABLE MONAZO DYE

William B. Reynolds, Cincinnati, Ohio, and Swanie S. Rossander, Wilmington, Del., assignors to E. I. du Pont de Nemours & Company, Wilmington, Del., a corporation of Delaware No Drawing. Application October 3, 1942, Serial No. 460,686

1 Claim. (Cl. 260—197)

This invention relates to chromable monazo dyes which are devoid of sulfonic acid groups, the coupling component of which is 2,7-dihydroxy naphthalene and the diazo components are unsubstituted and certain unsulfonated substituted compounds of the benzene series having a lake forming group in the ortho position to the azo bridge, such as hydroxy, carboxy, oxy-acetic or thio-glycollic.

When 2,6-, 1,5- or 1,4-dihydroxy naphthalenes are used as coupling components and coupled with the diazo components mentioned hereinabove, the chromed or unchromed dyeings from the products do not have as good fastness properties as are desired. We have now made the surprising discovery that the products made by coupling the same diazo components with 2,7-dihydroxy naphthalene give dyeings having good fastness properties. It is desired also to provide dyes which will give satisfactory level dyeings in deep shades by the metachrome method. In general, the commercially available metachrome monazo dyes which give shades of blue or black contain sulfonic acid groups. It has now been found that sulfonic acid groups not only exert a hypsochromic effect on the shade but they also reduce the tinctorial strength of the dyes when they are applied by the metachrome method as compared to the strength obtained by the afterchrome method. The dyes of this invention exhibit metachrome tinctorial strengths at least equal and in some cases superior to the afterchrome strength. The fastness properties of the metachrome dyeings are in many cases much superior to those of dyeings made by the afterchrome method.

It is among the objects of the present invention to provide new chromable monazo dyes which will give good level dyeings by the metachrome process. Another object of the invention is to provide chromable monazo dyes which will produce dyeings in deep shades having good fastness properties. Other objects of the invention will be apparent from the following description.

The objects of the invention are attained in general by providing a product of coupling produced in alkaline coupling medium in which the coupling component is 2,7-dihydroxy naphthalene and the diazo component is a primary arylamine which is devoid of sulfonic acid groups and which is from a group consisting of the primary arylamines of the benzene series having in a position which is ortho to the amino group, one of a group consisting of —OH, —COOH, —OCH₂—COOH and —SCH₂—COOH, and in not more than three other positions at least one member of a group consisting of hydrogen, nitro, chloro, bromo, alkyl and sulfonamide.

The invention will be more fully set forth in the following more detailed description which includes examples that are given as illustrative embodiments of the invention and not as limitations thereof. Parts are expressed in parts by weight unless otherwise noted.

Example 1

A solution containing 15.4 parts of 5-nitro-2-amino-phenol dissolved in 300 parts of water containing 4 parts of caustic soda is acidified by adding with rapid agitation 10.95 parts of hydrochloric acid in the form of a 10 N solution of the acid. The nitro-amino-phenol is thereby reprecipitated in finely divided form. A solution of 6.9 parts of sodium nitrite in 20 parts of water is now slowly added as fast as the nitrite is combined. When diazotization is complete, the diazotized amino-phenol is added to an ice cold solution composed of 16.8 parts of 2,7-dihydroxy naphthalene dissolved in 300 parts of water and 60 parts of soda ash. The coupling is allowed to proceed for five hours, after which time the dye is salted out from the cold solution by the addition of 120 parts of salt. This dye produces black dyeings on wool when applied by the usual chromate method. The dyeing has good fastness to fulling and to light. Applied to nylon by the afterchrome method, this dye gives a black with good fastness properties.

The monazo dye, isolated from an acid solution, is repreesnted by the formula

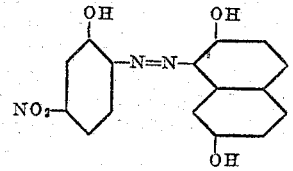

Example 2

By using an equivalent amount of 5-nitro-4-chloro-2-amino-phenol instead of 5-nitro-2-amino-phenol as described in Example 1, a dye is obtained which also dyes wool black by the chromate method. Dyeings from this dye are surprisingly fast to fulling, to wet steaming and potting, and to light. Applied to nylon by the afterchrome method, this dye gives a black with good fastness properties.

The monazo dye, in the form of its free acid, is represented by the formula

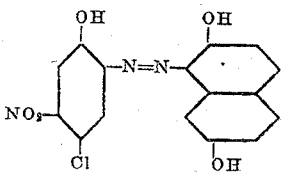

Example 3

By using an equimolecular amount of 4-nitro-2-amino-phenol instead of the 5-nitro-2-aminophenol in Example 1, the resulting dye gives a reddish brown dyeing when applied to wool by the chromate method.

The monazo dye, in the form of its free acid, is represented by the formula

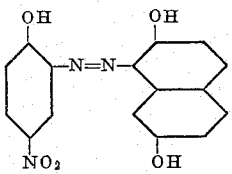

The following table illustrates other monazo combinations with 2,7-dihydroxy naphthalene which produce chromate reds, browns, and violets of good fastness properties on wool. The indicated diazo components were coupled with 2,7-dihydroxy naphthalene in alkaline medium in a manner similar to the foregoing description. The dyeings produced by chromate dyeing methods are noted in the right-hand column. These dyeings had the superior properties of the foregoing described dyes. Somewhat similar shades are obtained when these dyes are applied to nylon by the afterchrome method.

| Example | Diazo component | Color on wool by chromate method |
|---|---|---|
| 4 | 4-chloro-2-amino-phenol | Red brown. |
| 5 | Anthranilic acid | Do. |
| 6 | Picramic acid | Brown. |
| 7 | 6-chloro-2-amino-benzoic acid | Red brown. |
| 8 | 6-chloro-4-nitro-2-amino-phenol | Do. |
| 9 | 4-chloro-5-methyl-2-amino-phenol | Do. |
| 10 | 3,4,6-trichloro-2-amino-phenol | Violet brown. |
| 11 | 2-amino-phenol-4-sulfonamide | Violet. |
| 12 | 6-nitro-2-amino-benzoic acid | Violet brown. |
| 13 | 2-amino-thiophenoxy-acetic acid | Brownish red. |
| 14 | 4-nitro-6-methyl-2-amino-phenol | Red brown. |

Dyes having properties similar to those described in the foregoing examples which produced chromed dyeings on wool in a variety of shades including blacks, reds, browns and violets are similarly produced by using suitable quantities of the following compounds as diazo components, namely: 2-amino-phenol, 6-nitro-4-chloro-2-amino-phenol, 5-chloro-4-nitro-2-amino-phenol, 4,6-disulfonamide-2-amino-phenol, 3-chloro-2-amino-benzoic acid, 5-ethoxy-2-amino-1-thiophenoxy acetic acid, 5-chloro-2-amino-1-thiophenoxy acetic acid, 2-amino-1-phenoxy acid, 4,6-dichloro-2-amino-phenol, 4,6-dibromo-2-amino-phenol, 3,5-dichloro-2-amino-phenol, 3,5-dibromo-2-amino-phenol, 4-bromo-2-amino-phenol, 4-bromo-6-nitro-2-amino-phenol, 5-chloro-2-amino-benzoic acid, 5-bromo-2-amino-benzoic acid and 5-nitro-2-amino-benzoic acid. These dyes can be used to dye nylon fibers as well as wool by metachrome methods.

The described dyes may be applied either by the usual afterchrome method or by the chromate method. The chromate method of dyeing with chromed dyes is preferable because of the saving in time and since the dye is applied and chromed simultaneously on the fiber in one operation. In the afterchrome method, the fiber is dyed with the dye in a bath containing acetic acid and Glauber's salt and then the dyed fiber is put through a separate chroming operation. Another advantage of the chromate method is that the dyeing builds up to the final strength and shade in one operation. In the afterchrome method the dyeings undergo radical changes of shade and not infrequently radical changes of strength in the afterchroming operation. In the afterchrome method it is difficult for dyers to match the shades and strengths of other dyeings. The problem of providing chromate blacks, reds, browns and violets with good fastness to fulling and to light from a naphthalene coupling component capable of being prepared in good yields of high purity is solved by this invention.

From the foregoing disclosure it will be recognized that the invention is susceptible of modification without departing from the spirit and scope thereof and it is to be understood that the invention is not restricted to the specific illustrations thereof herein set forth.

We claim:

A monazo dye represented by the formula

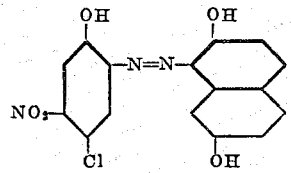

WILLIAM B. REYNOLDS.
SWANIE S. ROSSANDER.